US011729833B2

(12) United States Patent
Akkarakaran et al.

(10) Patent No.: US 11,729,833 B2
(45) Date of Patent: *Aug. 15, 2023

(54) ENHANCED RANDOM ACCESS CHANNEL (RACH) PROCEDURE (71) Applicant: QUALCOMM Incorporated, San Diego, CA (US)

(72) Inventors: Sony Akkarakaran, Poway, CA (US); Tao Luo, San Diego, CA (US); Ajay Gupta, San Diego, CA (US); Sumeeth Nagaraja, Los Altos, CA (US); Vinod Menon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,651

(22) Filed: May 3, 2021

(65) Prior Publication Data

US 2021/0259025 A1   Aug. 19, 2021

Related U.S. Application Data (63) Continuation of application No. 16/549,766, filed on Aug. 23, 2019, now Pat. No. 10,999,874, which is a
(Continued)

(51) Int. Cl.
*H04W 74/08* (2009.01)
*H04W 72/21* (2023.01)
*H04W 74/00* (2009.01)

(52) U.S. Cl.
CPC ....... *H04W 74/0833* (2013.01); *H04W 72/21* (2023.01); *H04W 74/004* (2013.01); *H04W 74/006* (2013.01); *H04W 74/008* (2013.01)

(58) Field of Classification Search
CPC ......... H04W 74/0833; H04W 72/0413; H04W 74/004; H04W 74/006; H04W 74/008
(Continued)

(56) References Cited

U.S. PATENT DOCUMENTS 8,060,259 B2   11/2011  Budhraja et al.
8,107,445 B2   1/2012   Lee et al.
(Continued)

FOREIGN PATENT DOCUMENTS

CN   108141299    * 10/2016
EP   3520538 A1    8/2019
(Continued)

OTHER PUBLICATIONS

Motorola Mobility: "Physical Channel Design for 2-Step RACH", 3GPP Draft, 3GPP TSG RAN WG1 Meeting NR, R1-1700880, Spokane, USA, Jan. 16-20, 2017, Jan. 17, 2017, 5 Pages.
(Continued)

*Primary Examiner* — Christopher R Crompton
(74) *Attorney, Agent, or Firm* — Arent Fox LLP and Qualcomm Incorporated (57) ABSTRACT The present disclosure describes a method, an apparatus, and a computer-readable medium for a random access channel (RACH) procedure at a user equipment. For example, the method may select a two-step RACH procedure or a four-step RACH procedure at the UE based at least on RACH configuration information received from a base station or the RACH configuration information at the UE. The example method may further include transmitting, from the UE, one or more messages associated with the two-step RACH procedure or the four-step RACH procedure based on the selection.

36 Claims, 7 Drawing Sheets

Related U.S. Application Data continuation of application No. 15/623,001, filed on Jun. 14, 2017, now Pat. No. 10,433,342.

(60) Provisional application No. 62/410,168, filed on Oct. 19, 2016.

(58) Field of Classification Search
USPC .......................................................... 370/329
See application file for complete search history.

(56) References Cited

U.S. PATENT DOCUMENTS

| | | | |
|---|---|---|---|
| 8,404,710 | B2 | 3/2013 | Nagasawa et al. |
| 9,363,829 | B2 | 6/2016 | Di et al. |
| 10,433,342 | B2 | 10/2019 | Akkarakaran et al. |
| 10,999,874 | B2 | 5/2021 | Akkarakaran et al. |
| 2009/0285180 | A1 | 11/2009 | Zhang et al. |
| 2011/0222476 | A1 | 9/2011 | Hole et al. |
| 2011/0249641 | A1 | 10/2011 | Kwon et al. |
| 2013/0064165 | A1 | 3/2013 | Chen et al. |
| 2013/0077582 | A1* | 3/2013 | Kim .................... H04W 74/002 370/329 |
| 2013/0215848 | A1 | 8/2013 | Kato et al. |
| 2014/0056243 | A1 | 2/2014 | Pelletier et al. |
| 2014/0098761 | A1 | 4/2014 | Lee et al. |
| 2014/0112254 | A1 | 4/2014 | Lindoff et al. |
| 2014/0117410 | A1 | 5/2014 | Li et al. |
| 2016/0337988 | A1 | 11/2016 | Nan et al. |
| 2017/0019930 | A1 | 1/2017 | Lee et al. |
| 2017/0347350 | A1 | 11/2017 | Takeda et al. |
| 2018/0042050 | A1 | 2/2018 | Kim et al. |
| 2018/0092064 | A1 | 3/2018 | Ryu et al. |
| 2018/0092129 | A1 | 3/2018 | Guo et al. |
| 2018/0092139 | A1 | 3/2018 | Novlan et al. |
| 2018/0103465 | A1 | 4/2018 | Agiwal et al. |
| 2018/0110075 | A1 | 4/2018 | Ly et al. |
| 2020/0037297 | A1 | 1/2020 | Pan et al. |
| 2020/0196234 | A1* | 6/2020 | Turtinen ................ H04W 24/08 |
| 2020/0196357 | A1 | 6/2020 | Park et al. |

FOREIGN PATENT DOCUMENTS

| | | | |
|---|---|---|---|
| JP | 2020036058 A | 3/2020 | |
| WO | WO 2010/148344 * | 12/2010 | ............ H04W 48/18 |
| WO | 2018064367 A1 | 4/2018 | |

OTHER PUBLICATIONS

Qualcomm Incorporated: "DL Based Mobility UL Channels", 3GPP Draft; R1-1610169, 3rd Generation Partnership Project (3GPP), Mobile Competence Centre; 650, Route Des Lucioles; F-06921 Sophia-Anti Polls Cedix; France, vol. RAN WG1, No. Lisbon, Portugal; Oct. 9, 2016, XP051150189, Retrieved from the Internet: URL:http://www.3gpp.org/ftp/Meetings_3GPP_SYNC/RAN1/Docs/ [retrieved on Oct. 9, 2016], 3 pages.

Asustek:"Consideration on Fallback of 2-step RACH Procedure", 3GPP Draft, 3GPP TSG-RAN WG2 Meeting #NR Ad Hoc, R2-1700358, 3rd Generation Partnership Project (3GPP), Mobile Competence Centre, 650, Route Des Lucioles, F-06921 Sophia-Anti Polls Cede, vol. RAN WG2, No. Spokane, USA, Jan. 17, 2017, XP051210937, 4 Pages,Retrieved from the Internet: URL:http://www.3gpp.org/ftp/Meetings_3GPP_SYNC/RAN2/Docs/ [retrieved on Jan. 17, 2017], Fallback from 2-step to 4-step RACH, When only the preamble is decoded and not the data part, receiving a RAR instead of contention resolution, as an indicator for the fallback, UE can select the fallback based on a radio condition threshold, paragraph [0001]-paragraph [0002].

Ericsson LM: "Pseudo CR 45.820-EC-GSM—Concept Description", 3GPP TSG GERAN Ad Hoc #1 on Cellular IoT, 3GPP Draft; GPC150088, PCR GSM Evolution—Concept description (Revision of GPC150063), 3rd Generation Partnership Project (3GPP), Mobile Competence Centre; 650, Route Des Lucioles; F-06921 Sophia-Antipolis Cedex; France, vol. TSG GERAN, No. Sofia Antipolis; Feb. 2, 2015, XP050931421, Retrieved from the Internet: URL:http://www.3gpp.org/ftp/Meetings_3GPP_SYNC/GERAN/Docs/ [retrieved on Feb. 2, 2015], 28 pages.

International Search Report and Written Opinion—PCT/US2017/055333—ISA/EPO—dated Jan. 3, 2018.

LG Electronics: "Consideration on RACH Procedure in NR", 3GPP Draft; R1-1609267, 3rd Generation Partnership Project (3GPP), Mobile Competence Centre; 650, Route Des Lucioles, F-06921 Sophia-Anti Polls Cedex; France, vol. RAN WG1, No. Lisbon, Portugal; Oct. 9, 2016, XP051149313, Retrieved from the Internet: URL: http://www.3gpp.org/ftp/Meetings_3GPP_SYNC/RAN1/Docs/ [retrieved on Oct. 9, 2016], 5 pages.

Nokia et al., "Random Access Principles for New Radio", 3GPP Draft; R1-1609737, 3GPP TSG-RAN WG1 #86bis, 3rd Generation Partnership Project (3GPP), Mobile Competence Centre, 650, Route Des Lucioles; F-06921 Sophia-Anti Polls Cedex; France, vol. RAN WG1, No. Lisbon, Portugal; Oct. 9, 2016, XP051149770, Retrieved from the Internet: URL:http://www.3gpp.org/ftp/Meetings_3GPP_SYNC/RAN1/Docs/ [retrieved on Oct. 9, 2016], 3 pages.

* cited by examiner

ENHANCED RANDOM ACCESS CHANNEL (RACH) PROCEDURE

CLAIM OF PRIORITY

The present Application for Patent is a Continuation of U.S. patent application Ser. No. 16/549,766, filed on Aug. 23, 2019, entitled, "Enhanced Random Access Channel (RACH) Procedure," which is a Continuation of U.S. patent application Ser. No. 15/623,001, filed on Jun. 14, 2017, entitled, "Enhanced Random Access Channel (RACH) Procedure," which claims priority to U.S. Provisional Patent Application Ser. No. 62/410,168, filed Oct. 19, 2016, entitled "Enhanced Random Access Channel (RACH) Procedure," each of which is assigned to the assignee hereof, and are hereby expressly incorporated by reference herein in their entireties.

BACKGROUND

Aspects of the present disclosure relate generally to wireless communication networks, and more particularly, to random access channel (RACH) procedure at a user equipment (UE).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

5G/NR wireless systems target low latencies which need faster and more efficient schemes for random access. However, the four-step random access channel (RACH) procedure of LTE may not meet the low latency requirements of 5G/NR wireless systems. Therefore, a faster and more efficient RACH procedure is desired.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to one example, a method for a RACH procedure at a UE is provided. The method includes selecting, at the UE, a two-step RACH procedure or a four-step RACH procedure, wherein the selecting is based at least on RACH configuration information received from a base station or the RACH configuration information at the UE; and transmitting, from the UE, one or more messages associated with the two-step RACH procedure or the four-step RACH procedure based on the selection.

In another example, an apparatus for a RACH procedure at a UE is provided. The apparatus includes a memory configured to store data; and one or more processors communicatively coupled with the memory, wherein the one or more processors and the memory are configured to select, at the UE, a two-step RACH procedure or a four-step RACH procedure, wherein the selection is based at least on RACH configuration information received from a base station or the RACH configuration information at the UE; and transmit, from the UE, one or more messages associated with the two-step RACH procedure or the four-step RACH procedure based on the selection.

In a further example, a user equipment for a RACH procedure is provided. The user equipment includes means for selecting, at the UE, a two-step RACH procedure or a four-step RACH procedure, wherein the selecting is based at least on RACH configuration information received from a base station or the RACH configuration information at the UE; and means for transmitting, from the UE, one or more messages associated with the two-step RACH procedure or the four-step RACH procedure based on the selection.

Additionally, in another example, a computer readable medium storing computer executable code for a RACH procedure at user equipment is provided. The computer readable medium includes code for selecting, at the UE, a two-step RACH procedure or a four-step RACH procedure, wherein the selecting is based at least on RACH configuration information received from a base station or the RACH configuration information at the UE; and code transmitting, from the UE, one or more messages associated with the two-step RACH procedure or the four-step RACH procedure based on the selection.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

Figure 1:
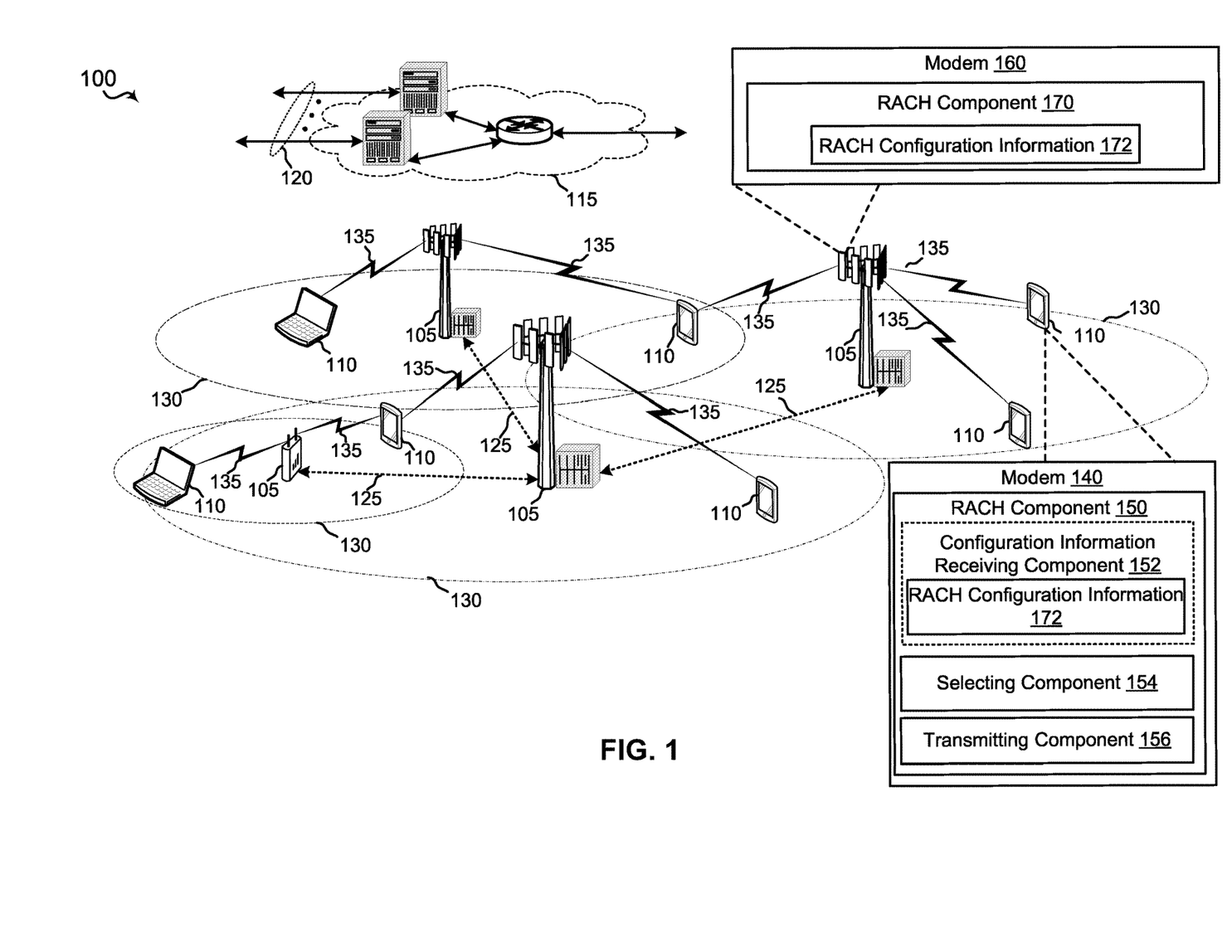
FIG. 1 is a schematic diagram of a wireless communication network including at least one UE having a RACH component and at least one base station having a corresponding RACH component, both RACH components are configured according to this disclosure for executing a RACH procedure at the UE.

The present disclosure generally relates to a RACH procedure at a UE (e.g., UE 110). For example, a base station (e.g., base station 105) may send configuration information (e.g., RACH configuration information 172, also referred to as configuration information) to the UE, e.g., UE 110. The RACH configuration information indicates conditions that may trigger selection of a two-step or a four-step RACH procedure at the UE. For example, based on the RACH configuration information received from the base station, the UE may determine RSRP values of a synchronization signal or a reference signal received from the base station and select the two-step RACH procedure if the RSRP value of the synchronization signal or the reference signal is equal to or above a threshold and select the four-step RACH procedure if the RSRP value of the synchronization signal or the reference signal is below the threshold. In another example, the conditions for triggering the two-step RACH procedure may be defined in 3GPP Specifications. That is, there is no need for the base station to send the RACH configuration information to trigger the two-step RACH procedure at the UE. The UE is to free to choose the two-step RACH procedure as determined by the UE.

In the two-step RACH procedure, the UE collapses (e.g., combines) a first message (e.g., message 1) and a third message (e.g., message 3) of the four-step RACH procedure into one message, e.g., message 13, and transmits to the base station. The base station combines a second (e.g., message 2) and a fourth message (e.g., message 4) of the four-step RACH procedure and sends as a response (e.g., message 24) to the UE. The collapsing or combining of the messages provides a low-latency RACH procedure at the UE. An optional sounding reference signal (SRS) which may be used as a reference signal is transmitted with the combined message that is transmitted to the base station.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a RACH component 150 that manages execution of a configuration information receiving component 152 (optional), a selecting component 154, and/or a transmitting component 156 for a RACH procedure at UE 110. The example wireless communication network 100 may further include a base station (or an eNB/gNB) 105 with a modem 160 and/or a corresponding RACH component 170 for transmitting RACH configuration information 172 to UE 110 and/or assist with the RACH procedure at UE 110.

For example, UE 110 and/or RACH component 150 may be configured to receive RACH configuration information 172 from base station 105. The RACH configuration information 172 indicates to UE 110 the conditions under which UE 110 selects a four-step or a two-step RACH procedure.

The four-step and the two-step RACH procedures are described below in detail with respect to FIGS. 3 and 4, respectively.

In one aspect, UE 110 and/or RACH component 150 may include a configuration information receiving component 152 (optional) to receive RACH configuration information 172, a selecting component 154 to select the two-step or the four-step RACH procedure, and/or a transmitting component 156 to transmit one or more messages associated with the two-step or the four-step RACH procedure based on the selection. Base station 105 may include a RACH component 170 to transmit RACH configuration information 172 to UE 110. In another aspect, the conditions for triggering the two-step RACH procedure may be defined in 3GPP Specifications. That is, there is no need for the base station to send the RACH configuration information to trigger the two-step RACH procedure at the UE. The UE is to free to choose the two-step RACH procedure as determined by the UE.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base station 105 may be referred to as a base transceiver station, a radio base station, an access point, an access node, a radio transceiver, a gNB/NR for supporting 5G wireless communications, a NodeB, eNodeB (eNB), Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of base stations provide coverage for various geographical regions. For example, each base station or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An base station for a macro cell may be referred to as a macro base station. An base station for a small cell may be referred to as a small cell base station, a pico base station, a femto base station, or a home base station. A base station may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro base stations, small cell base stations, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2A:
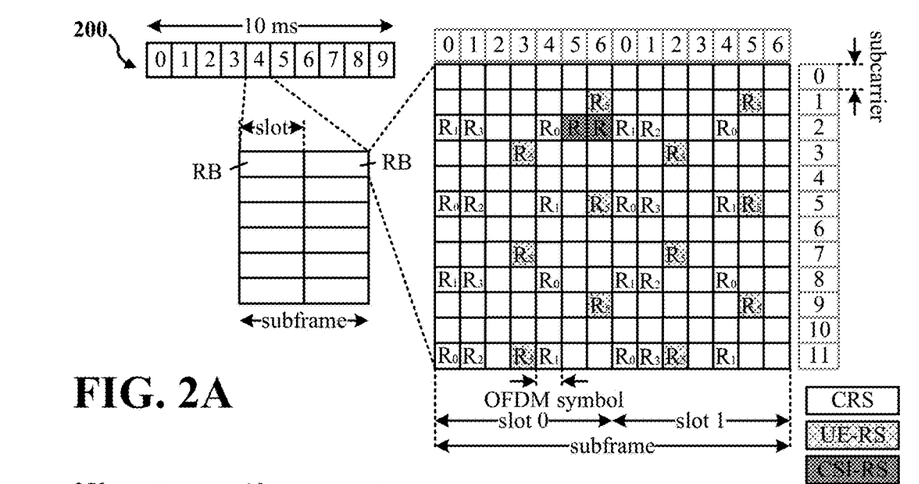
FIG. 2A is a diagram illustrating an example of a DL frame structure.
Figure 2B:
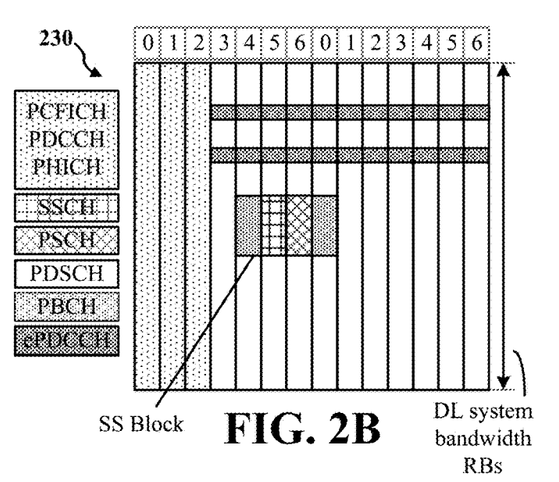
FIG. 2B is a diagram illustrating an example of channels within the DL frame structure.
Figure 2C:
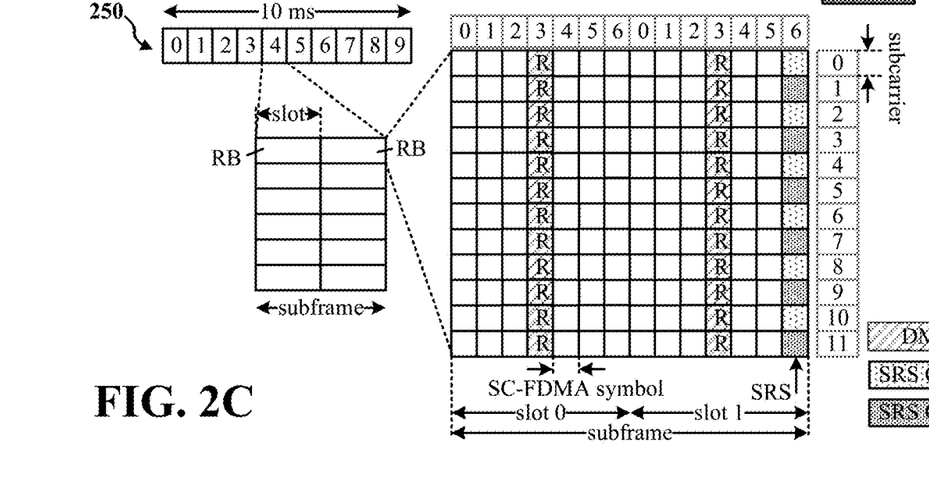
FIG. 2C is a diagram illustrating an example of an UL frame structure.
Figure 2D:
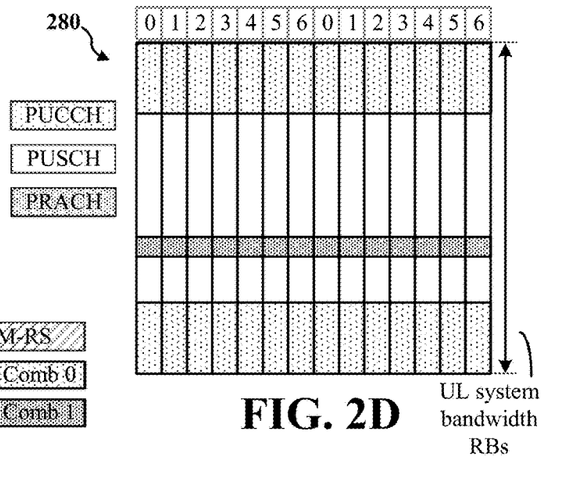
FIG. 2D is a diagram illustrating an example of channels within the UL frame structure.

FIG. 2A is a diagram 200 illustrating an example of a DL frame structure used for communications from base station 105 to UE 110. FIG. 2B is a diagram 230 illustrating an example of channels within the DL frame structure (e.g., downlink shared channel (DL-SCH)). FIG. 2C is a diagram 250 illustrating an example of an UL frame structure used for communications from UE 110 to base station 105. FIG. 2D is a diagram 280 illustrating an example of channels within the UL frame structure (e.g., uplink shared channel (UL-SCH), physical random access channel (PRACH)). Other wireless communication technologies may have a different frame structure and/or different channels.

A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol.

A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS.

The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
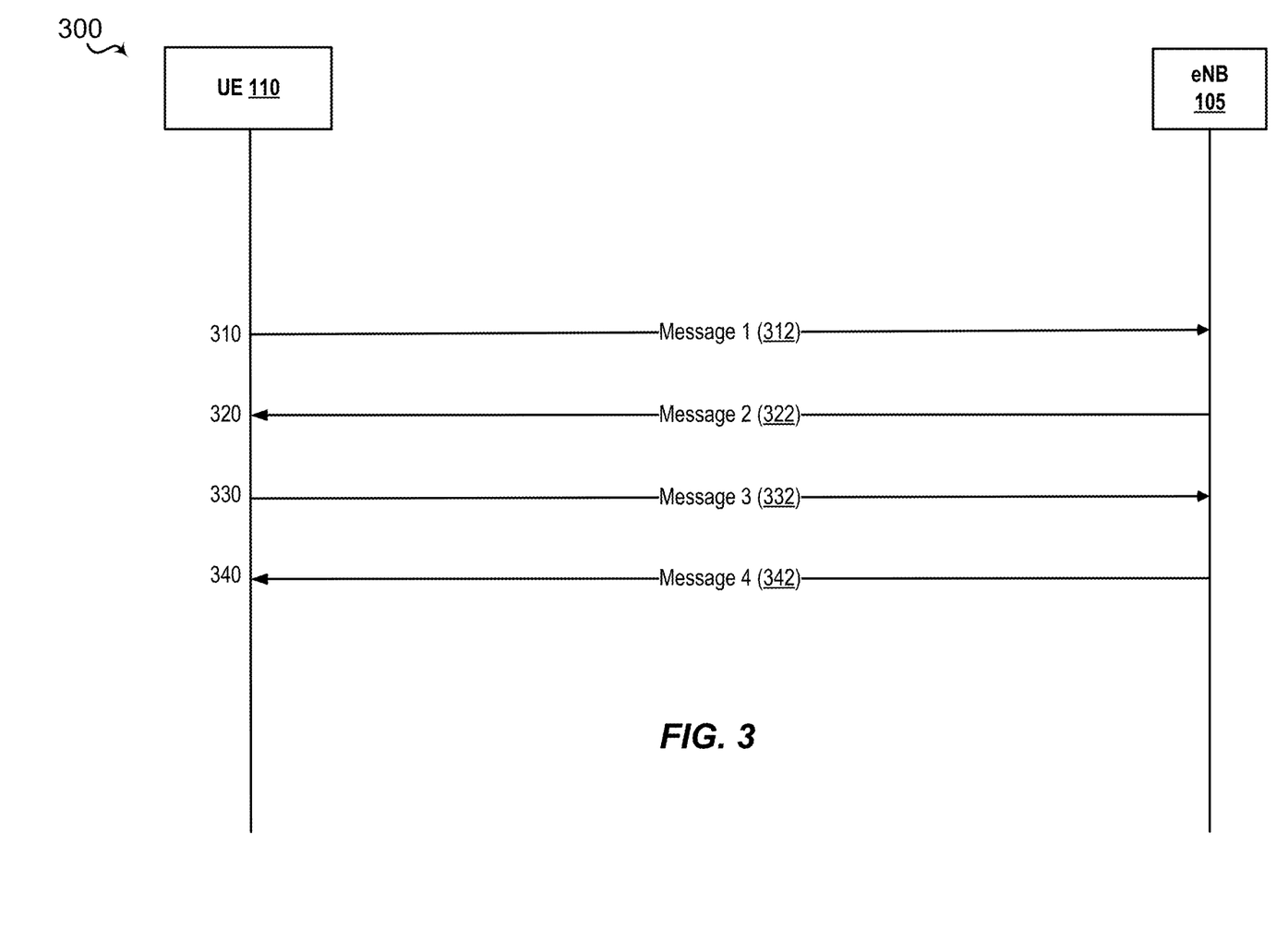
FIG. 3 illustrates an example four-step RACH procedure at a UE.

FIG. 3 illustrates an example four-step RACH procedure 300 at a UE.

At operation 310, UE 110 and/or RACH component 150 may transmit (or send) a message 1 (312) to base station 105. UE 110 may transmit message 1 (312) using a preamble (also referred to as a RACH preamble, a PRACH preamble, or a sequence, e.g., as shown in FIG. 2D) that is selected from 64 RACH preambles or sequences. UE 110 also sends identity of UE 110 to base station 105 so that the network (e.g., base station 105) can address UE 110 in the next operation (e.g., operation 320). The identity used by UE 110 may be a random access-radio network temporary identifier (RA-RNTI) which is determined from a time slot number in which the RACH preamble or sequence is sent.

At operation 320, UE 110 and/or RACH component 150 may receive a message 2 (322) from base station 105. UE 110 receives message 2 (322) in response to sending message 1 (312) to base station 105. Message 2 (322) may be a random access response (RAR) and received on a downlink-shared channel (DL-SCH) from base station 105. The RAR may be addressed to the RA-RNTI calculated by base station 105 from the timeslot in which the preamble or sequence is sent. Message 2 (322) may also carry the following information: a cell-radio network temporary identifier (C-RNTI) which may be used for further communications between UE 110 and base station; a timing advance value which informs UE 110 to change timing of UE 110 to compensate for round trip delay due to the distance between UE 110 and base station 105; and/or uplink grant resources which may be an initial resources assigned to UE 110 by base station so that UE 110 can use a uplink-shared channel (UL-SCH) during operation 330, as described below.

At operation 330, UE 110 and/or RACH component 150 may send message 3 (332) to base station 105. UE 110 sends message 3 (332), which may be a "radio resource control (RRC) connection request message," to base station 105 in response to receiving message 2 (322) from base station 105. The RRC connection request message may be sent to base station 105 using the UL-SCH based on uplink grant resources granted during operation 320. UE 110 may use the C-RNTI that is assigned to UE 110 by base station 105 during operation 320 when sending the RRC connection request message.

Message 3 (332) or the RRC connection request message may include UE identity, for example, a temporary mobile subscriber identity (TMSI) or a random value. The TMSI may be used for identifying UE 110 in a core network (e.g., core network 115) and if UE 110 has previously connected to the same core network (e.g., core network 115). Optionally, the random value may be used if UE 110 is connecting to the network for the first time. Message 3 (332) may also include a connection establishment cause which indicates the reason UE 110 needs to connect to the network (e.g., base station 105).

At operation 340, UE 110 and/or RACH component 150 may receive a message 4 (342) from base station 105. Message 4 (342) may be a contention resolution message from base station 105 if base station 105 successfully received and/or decoded message 3 (332) sent from UE 110. base station 105 may send message 4 to base station 105 using the TMSI value of the random number described above, but may also contain a new C-RNTI which will be used for further communications between UE 110 and base station 105. UE 110 uses the above described four-step RACH procedure for synchronizing with the network when establishing a connection.

Figure 4:
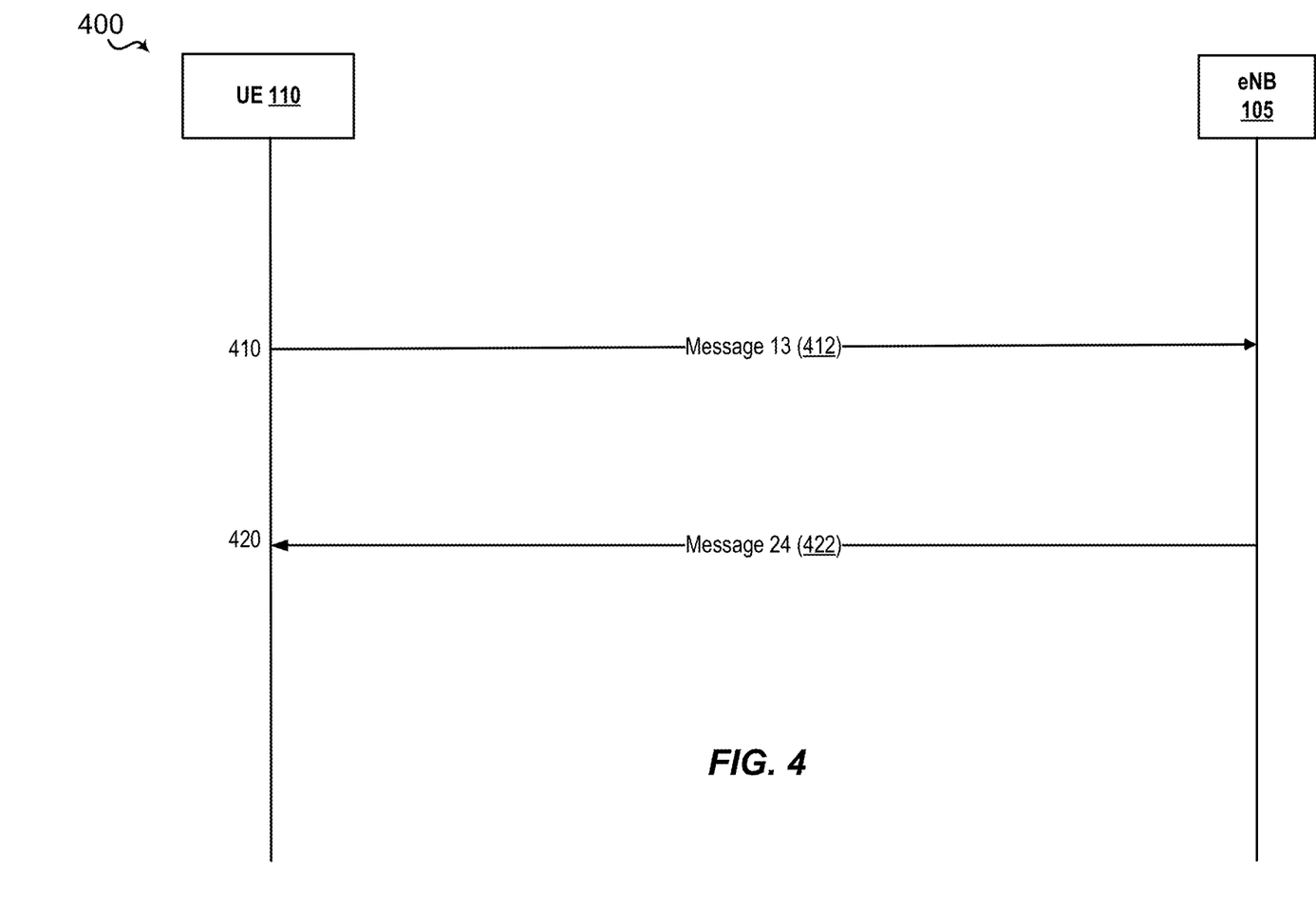
FIG. 4 illustrates an example two-step RACH procedure at a UE according to an aspect of the present disclosure.

FIG. 4 illustrates an example RACH procedure for NR 400 at a UE according to an aspect of the present disclosure.

At operation 410, UE 110 and/or RACH component 150 may transmit (or send) a message 13 (412), also referred to a first message or a first message of the two-step RACH procedure, to base station 105. In an aspect, for example, message 1 (312) and message (322) described above in reference to FIG. 3 above, may be collapsed (e.g., combined) into message 13 (412) and sent to base station 105. Message 1 (412) may include a sequence, which may have been selected from 64 possible sequences, and may be used a reference signal (RS) for demodulation of data transmitted in message 13 (412).

At operation 420, UE 110 and/or RACH component 150 may receive a message 24 (422), also referred to a second message or a second message of the two-step RACH procedure, from base station 105. UE 110 may receive message 24 (422) in response to sending message 13 (412) to base station 105. Message 24 (422) may be a combination of message 2 (322) and message 4 (342) as described above in reference to FIG. 3.

The combining of messages 1 (312) and (332) into one message 13 (412) and receiving of message 24 (422) in response from base station 105 allows the UE to reduce the RACH procedure setup time to support the low-latency requirements of 5G/NR. Although, UE 110 may be configured to support the two-step RACH procedure, UE 110 still supports the four-step RACH procedure as a fall back as the UE 110 may not be able to relay on the two-step RACH procedure due to some constraints, e.g., high transmit power requirements, etc. Therefore, a UE in 5G/NR may be configured to support both the two-step and the four-step RACH procedures, and determines which RACH procedure to configure based on the RACH configuration information received from base station 105.

Figure 5:
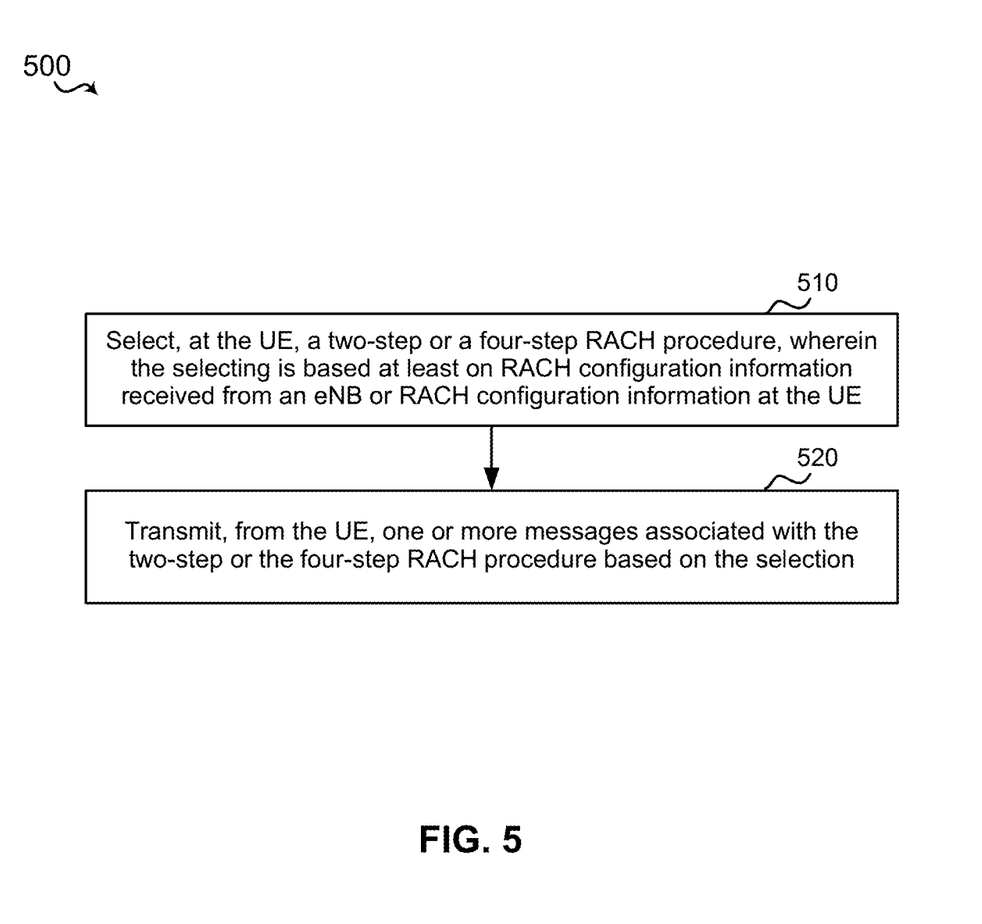
FIG. 5 is a flow diagram of an example method of a RACH procedures at a user equipment, according to an aspect of the present disclosure.

FIG. 5 is a flowchart illustrating a method 500 for a RACH procedure at a UE.

In an aspect, at block 510, methodology 500 may include selecting, at the UE, a two-step or a four-step RACH procedure, wherein the selecting is based at least on RACH configuration information received from a base station or the RACH configuration information at the UE. For example, in an aspect, UE 110 and/or RACH component 150 may include selecting component 154, such as a specially programmed processor module, or a processor executing specially programmed code stored in a memory, to select the two-step or the four-step RACH procedure based at least on RACH configuration information 172 received from base station 105. The RACH configuration information 172 indicates conditions that trigger selection of the two-step or the four-step RACH procedure. In additional or optional aspect, the RACH configuration information 172 may be already available (or present at UE 110) as defined, for example, by 3GPP Specifications and/or UE 110 is free to choose either the two-step or the four-step RACH procedure as the UE 110 see fit (as defined in the 3GPP Specifications). That is, there is no need for UE 110 to receive the RACH configuration information 172 from the base station 105, the RACH configuration information 172 may be already present/configured at UE 110.

In one aspect, for example, UE 110 may receive RACH configuration information 172 via a master information block (MIB) or a system information block (SIB) broadcasted from base station 105. The MIB/SIB may indicate conditions under which UE 110 may select a 2-step or a 4-step RACH procedure. That is, the MIB/SIB may indicate conditions that trigger selection of the two-step or the four-step RACH procedure. UE 110 needs to receive (e.g., from base station 105) at least the MIB, SIB1, and/or SIB2 prior to initiating the RACH procedure at the UE. For example, the conditions that trigger selection of the two-step or the four-step RACH procedure may be based on RSRP values of a synchronization signal or a reference signal received from base station 105.

For instance, the RACH configuration information 172 may indicate conditions that trigger selection of the two-step or the four-step RACH procedure. UE 110 may measure reference signal received power (RSRP) of a synchronization channel or a reference signal received from base station 105, compare the measured RSRP value with a threshold value, and/or select the two-step or four-step RACH procedure based on whether the RSRP value is above or below the threshold value. For example, UE 110 may select the two-step RACH procedure if UE 110 measures the RSRP of the synchronization or the reference signal and determines that the RSRP value of the synchronization or the reference signal is equal to or above the threshold value. In an additional or optional aspect, UE 110 may select the four-step RACH procedure if the RSRP value of the synchronization signal or the reference signal is below the threshold value. The threshold value, for example, may be configured by base station 105 and indicated to UE 110 via RACH configuration information 172.

In an aspect, a low (e.g., lower than the threshold) RSRP at UE 110 may indicate that UE 110 is located far (e.g., not near) from base station 105 as compared to a UE with high (or higher) RSRP. That is, the RSRP of the synchronization signal or the reference signal at UE 110 is based (e.g., inversely related) on the distance from base station 105. Further, UE 110 may need higher transmit power for the two-step RACH procedure (as compared to the four-step RACH procedure) as higher transmit power is needed to create a link (e.g., UL-SCH) with base station 105. Furthermore, UE 110 may need higher transmit power to transmit Message 13 (412) using the two-step RACH procedure when compared to transmitting a message 1 (312) using the four-step RACH procedure as timing adjustment is not present in the two-step RACH procedure. In other words, the transmit powers needed for transmitting message 13 (412) and message 1 (312) are different and higher for transmitting message 13 (412) to base station 105. Moreover, the transmit power required for initial access probe may be an offset of RSRP, and the offsets may be different for message 1 (312) and message 13 (412).

In an additional aspect, UE 110 may initiate the two-step RACH procedure based on RSRP value (e.g., RSRP value equal or above the threshold) and may switch to a four-step RACH procedure if the transmit power required to transmit message 13 (412) is high, or if the RSRP value falls below the threshold during re-transmission of message 13. Base station 105 may notify UE 110 about the transmit power needed for configuring the two-step RACH procedure via RACH configuration information 172. Base station 105 may also instruct the UE to switch from the two-step RACH procedure to the four-step RACH procedure through its response to Message 13. When UE 110 switches to the four-step RACH procedure after transmitting Message 13 and before receiving a response from base station 105, UE 110 may continue using transmit power level that would have been used if the switch had not occurred, or UE 110 may apply an offset value to the power level, or UE may determine the power level using the method used to determine power level at the start of a four-step RACH procedure without applying any consideration to the previous two-step RACH procedure transmissions. When UE 110 switches to the four-step RACH procedure based on the response to Message 13 received from base station 105, UE 110 may transmit Message 3 using a power level indicated in the response received from base station 105.

In an aspect, at block 520, methodology 500 may include transmitting, from the UE, one or more messages associated with the two-step or the four-step RACH procedure based on the selection. For example, in an aspect, UE 110 and/or RACH component 150 may include transmitting component 156, such as a specially programmed processor module, or a processor executing specially programmed code stored in a memory, to transmit, from UE 110, one or more messages based on the selection. For instance, UE 110 may transmit message 13 (422) if UE 110 selects the two-step RACH procedure and UE 110 may transmit message 1 (312), message 3 (332) if UE 110 selects the four-step RACH procedure, and accordingly receive messages from base station 105.

For example, in an aspect, when UE 110 selects the two-step RACH procedure, UE 110 may transmit message 13 (412) to base station 105. Message 13 (412) may be regular uplink data (e.g., control data) which may include a reference signal for demodulating UL data transmitted from UE 110. In such a scenario, there is no need to separately send a sequence, as described above in reference to FIG. 3, as the reference signal transmitted with the UL data from UE 110 may be used as the sequence (e.g., replace the sequence). However, if UE 110 sends the sequence, the sequence may serve as the reference signal for demodulating the uplink data transmitted from UE 110. If both the reference signal and the sequence are transmitted from UE 110, UE 110 and/or RACH component 150 may combine the sequence and the reference signal prior to transmitting to base station 105.

In one example, UE 110 may send a sounding reference signal (SRS) to base station 105. The SRS is a reference signal transmitted by a UE and used by an base station for estimating uplink channel quality over a wider bandwidth and uplink frequency selective scheduling. For example, in the two-step RACH configuration, UE 110 may transmit the SRS with message 13 (412) and base station 105 measures uplink quality. The SRS may be sent on a same beam as a sequence and/or data, used as phase reference for data, and/or may be repeated to allow base station Rx beam training.

Further, the number of antenna ports used by UE 110 for transmitting the SRS may be different from the number of antenna ports used for PRACH transmission. In an aspect, the maximum number of antenna ports that may be used by the SRS may be signaled by base station 105 to UE 110 via the MIB or the SIBs, and/or the actual number of antenna ports used by UE 110 for SRS transmission may be blindly detected at base station 105 or signaled by UE 110 using different SRS resources. Furthermore, the bandwidth of the SRS may be different as compared to the reference signal and/or data, and may signal UE bandwidth information. In an additional or optional aspect, cyclic prefixes (CPs) of a reference signal, data, and/or SRS need not be equal (e.g., may be different). A CP generally refers to prefixing of a symbol with a repetition of the end and may be signaled (e.g., broadcasted) by base station 105 to UEs via a MIB and/or SIBs.

During a handover of UE 110 from one base station to another base station (e.g., from a source base station to a target base station), a RACH (e.g., contention-free RACH) may also carry a payload instead of just a sequence (e.g., a PRACH sequence). The sequence may be replaced by or serve as a reference signal for the payload. The payload may be, for example, a measurement report, a buffer status report, channel state feedback (CSF), and/or data. In one example, a handover message may indicate timing adjust information, referred to as timing adjust, which may be estimated by the target base station based on detection of the SRS transmission from UE 110. The source base station may request such SRS transmission which is transmitted with one or more directions by UE. In another example, the timing adjust information may be estimated by the source base station based on deployment geometry, beam direction to a UE, and/or past history of timing adjust commands sent to the UE. Additionally, the source base station and the target base station communicate with each other such that target base station is prepared to receive the RACH.

Moreover, the waveform selection for the two-step RACH procedure, for example, OFDM and SC-FDM may follow rules that are similar to message 3 (332) of the four-step RACH procedure. For instance, the MIB and/or SIBs may indicate different thresholds for the two-step and four-step RACH procedures based on RSRP values. The thresholds, for example, may be semi-statically configured in MIB/SIBs. The MIB and/or SIBs may also indicate diversity scheme for message 13 (412) data and message 13 (412) may include beam-training signal request.

In an aspect, for example, in the four-step RACH procedure, a RACH sub-frame, which may be same or similar to sub-frames shown in FIGS. 2A-2D, for example, may be reserved for message 1 (312) transmissions that may not have perfect timing adjustment, and the message 1 (312) transmissions under such conditions may be beam-paired with corresponding downlink beams, e.g., a synchronization channel from the base station. For the 2-step RACH procedure, the same beam pairing is maintained, although, for larger UE transmissions (e.g., message 13 (412) is larger than message 1 (312) as message 13 includes information that is in message 1 (312) and message 3 (332)). For example, separate RACH sub-frames may be used for message 1 (312) and message 13 (412), and the sub-frames optimized to the particular transmission. For instance, the sub-frame for message 13 (412) may have longer duration and/or different periodicity as compared to message 1 (312). However, the use of separate sub-frames is not optimal as it may involve additional overhead due to the use of separate sub-frames.

In another aspect, beam-pairing may be maintained in the same sub-frame. However, this requires message 13 (412) and message 1 (312) have the same transmission duration. This is possible by using a larger bandwidth for message 13 (412) to accommodate the larger data payload of message 13 (412). In a further additional aspect, message 13 (412) may be transmitted in two parts on two separate beams. The first part of message 13 (412) may be similar to message 1 (312) and the second part of message 13 (412) may be similar to message 3 (332). The first and the second parts may include both reference signal and data transmissions, and the first part of message 13 (412) may carry information (e.g., frequency assignment) of the second part as well. The reference signals used in the two parts of message 13 (412) are related to each other by a one-to-one mapping so base station 105 could identify and match the two parts.

In one aspect, for example, in case of a two beam message 13 (412), message 24 (422) may be received at UE 110 in two parts (or sent by base station 105 in two parts) on two beams corresponding to the two beams used for sending message 13 (412). In one example, the RAR payload may be split between these two parts, or repeated across them with possibly different redundancy versions (RVs) to allow soft combining across them.

In an additional aspect, in both the two-beam and one-beam configurations of message 13 (412), base station 105 may sometimes detect the PRACH/reference signal sequence part (e.g., first part) but fail CRC-check on the data part (e.g., second part). In such a case, for example, the RAR could indicate whether base station 105 successfully decoded the second part of message 13 (412). For instance, the RAR may be sent in user-specific search-space if successfully decoded and in common search space if the decoding was not successful. Alternatively, the RAR may be sent as a message that is similar to message 2 (322) of the four-step RACH procedure instructing UE 110 to switch to the four-step RACH message 3 (332) next. The base station 105 may then do a LLR-combining of the expected message 3 (332) transmission with data portion of the initial message 13 (412) transmission.

Thus, UE 110 may execute a two-step RACH procedure, a four-step RACH procedure at UE 110, and may transition from the two-step to the four-step RACH procedure as needed to support URLLC in 5G/NR.

Figure 6:
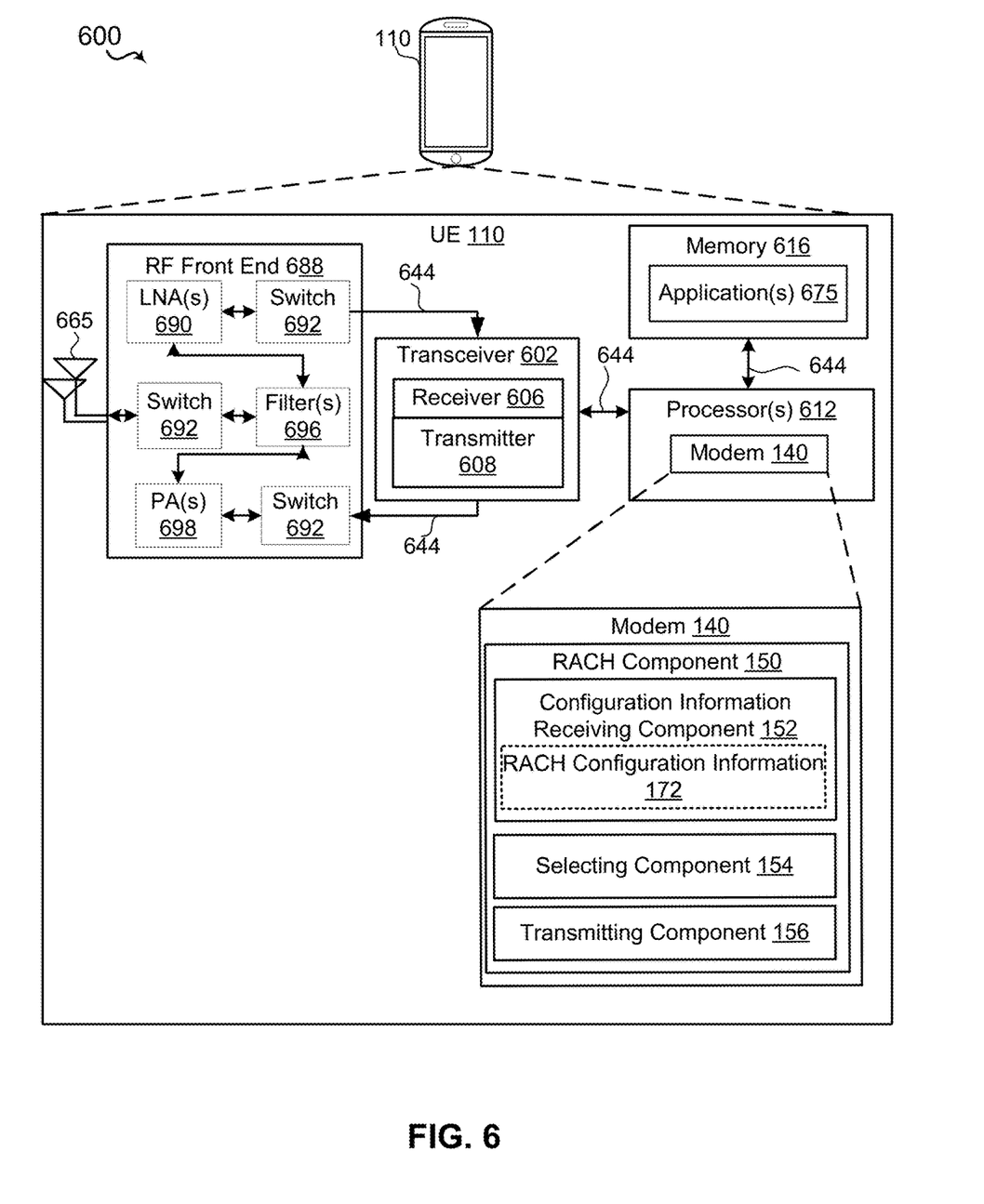
FIG. 6 is a schematic diagram of example components of the UE of FIG. 1.

Referring to FIG. 6, one example of an implementation of UE 110 may include a variety of components, some of which have already been described above, but including components such as one or more processors 612, memory 616, and transceiver 602 in communication via one or more buses 644, which may operate in conjunction with modem 140 and RACH component 150 to execute a RACH procedure at UE 110. Further, the one or more processors 612, modem 140, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 140 that uses one or more modem processors. The various functions related to RACH component 150 may be included in modem 140 and/or processors 612 and, in an aspect, can be executed by a single processor, while in other aspects, different ones of the functions may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 140 associated with RACH component 150 may be performed by transceiver 602.

Also, memory 616 may be configured to store data used herein and/or local versions of applications 675 or RACH component 150 and/or one or more of its subcomponents being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes defining RACH component 150 and/or one or more of its subcomponents, and/or data associated therewith, when UE 110 is operating at least one processor 612 to execute uplink power control component 150 and/or one or more of its subcomponents.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by UE 110. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 can communicate with, for example, one or more base stations 105 or one or more cells associated with one or more base stations 105. In an aspect, for example, modem 140 can configure transceiver 602 to operate at a specified frequency and power level based on the UE configuration of the UE 110 and the communication protocol used by modem 140.

In an aspect, modem 140 can be a multiband-multimode modem, which can process digital data and communicate with transceiver 602 such that the digital data is sent and received using transceiver 602. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 7:
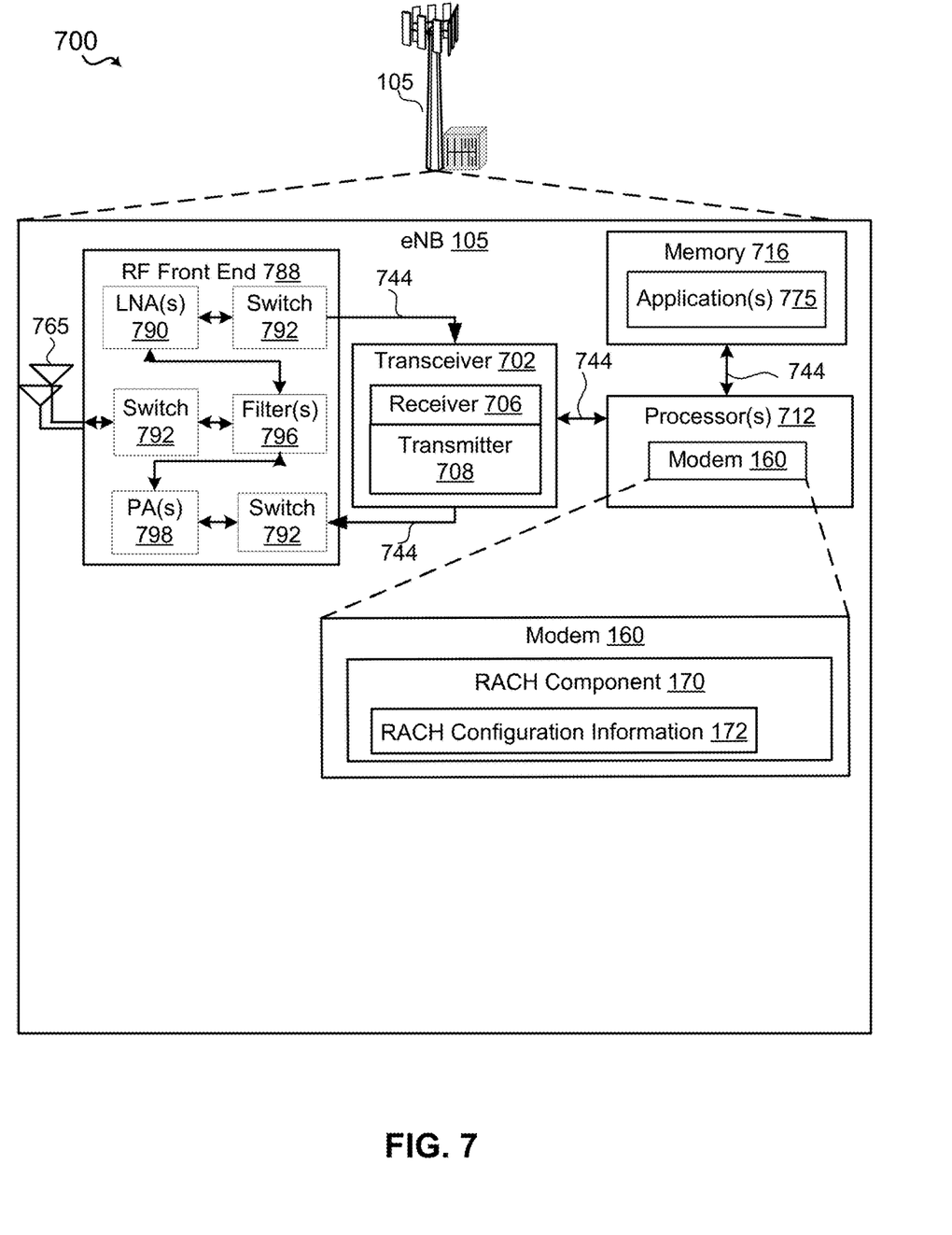
FIG. 7 is a schematic diagram of example components of the base station of FIG. 1.

Referring to FIG. 7, one example of an implementation of base station 105 may include a variety of components, some of which have already been described above, but including components such as one or more processors 712, memory 716, and transceiver 702 in communication via one or more buses 744, which may operate in conjunction with modem 160 and RACH component 170 to execute a RACH procedure at base station 105. The components in FIG. 7 that are similar to the components in FIG. 6 are configured to operate in a similar manner.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of a random access channel (RACH) procedure at a user equipment (UE), comprising:
   receiving, at the UE, RACH configuration information from a base station, with the RACH configuration information being in a master information block (MIB) or a system information block (SIB);
   selecting, at the UE, a RACH procedure from among at least two RACH procedures, with the selecting based at least on the RACH configuration information; and transmitting, from the UE, one or more messages associated with the selected RACH procedure.

2. The method of claim 1, further comprising:
receiving, at the UE, either a synchronization signal or a reference signal from a base station; and wherein the selecting the RACH procedure is based on the RACH configuration information and either the received synchronization signal or the received reference signal.

3. The method of claim 2, wherein the selecting the RACH procedure is based on the RACH configuration information and either a reference signal received power (RSRP) value of the received synchronization signal or a RSRP value of the received reference signal in comparison with a corresponding threshold value.

4. The method of claim 3, wherein the corresponding threshold value is from the RACH configuration information.

5. The method of claim 3, wherein the selecting the RACH procedure includes selecting a two-step RACH procedure and the method further comprises:
switching from the selected two-step RACH procedure to a four-step RACH procedure if a transmit power required to transmit a message is higher than a threshold or if the RSRP value of the received synchronization signal or of the received reference signal falls below a threshold during re-transmission of the message or if a command to switch is received from the base station.

6. The method of claim 5, further comprising:
using a transmit power based on the selected two-step RACH procedure prior to the switching, applying an offset to the transmit power based on the selected two-step RACH procedure prior to the switching, or using a transmit power based on a four-step RACH procedure, and prior to receiving a response from the base station.

7. The method of claim 1, wherein the at least two RACH procedures comprise at least a two-step RACH procedure and a four-step RACH procedure.

8. The method of claim 1, wherein:
the selecting the RACH procedure includes selecting a two-step RACH procedure; and
the transmitting one or more messages comprises transmitting a first message including a physical RACH (PRACH) sequence used as a reference signal by a base station or a sounding reference signal by the base station.

9. The method of claim 8, wherein the transmitting one or more messages comprises transmitting a payload as part of a first message and occurs during a handover of the UE.

10. The method of claim 9, wherein the payload is a measurement report, a buffer status report, channel state feedback (CSF) information, or user data.

11. The method of claim 1, further comprising:
receiving, from a base station during a handover of the UE, timing adjustment information.

12. The method of claim 1, wherein the selecting the RACH procedure includes selecting a two-step RACH procedure and the transmitting one or more messages comprises transmitting a first message to a base station over one or more beams, the method further comprising:
receiving, from the base station, a second message over the one or more beams in response to transmitting the first message.

13. A user equipment (UE) using a random access channel (RACH) procedure, comprising:

a memory storing instructions; and
one or more processors coupled with the memory and configured to execute the instructions to:
receive, at the UE, RACH configuration information from a base station, with the RACH configuration information being in a master information block (MIB) or a system information block (SIB);
select, at the UE, a RACH procedure from among at least two RACH procedures, with the selecting based at least on the RACH configuration information; and
transmit, from the UE, one or more messages associated with the selected RACH procedure.

14. The UE of claim 13, further comprising the one or more processors executing the instructions to:
receive, at the UE, either a synchronization signal or a reference signal from a base station; and wherein the selecting the RACH procedure is based on the RACH configuration information and either the received synchronization signal or the received reference signal.

15. The UE of claim 14, wherein the selecting the RACH procedure is based on the RACH configuration information and either a reference signal received power (RSRP) value of the received synchronization signal or a RSRP value of the received reference signal in comparison with a corresponding threshold value.

16. The UE of claim 15, wherein the corresponding threshold value is from the RACH configuration information.

17. The UE of claim 15, wherein the selecting the RACH procedure includes selecting a two-step RACH procedure and further comprising the one or more processors executing the instructions to:
switch from the selected two-step RACH procedure to a four-step RACH procedure if a transmit power required to transmit a message is higher than a threshold or if the RSRP value of the received synchronization signal or of the received reference signal falls below a threshold during re-transmission of the message or if a command to switch is received from the base station.

18. The UE of claim 17, further comprising the one or more processors executing the instructions to:
use a transmit power based on the selected two-step RACH procedure prior to the switching, apply an offset to the transmit power based on the selected two-step RACH procedure prior to the switching, or use a transmit power based on a four-step RACH procedure, and prior to receiving a response from the base station.

19. The UE of claim 13, wherein the at least two RACH procedures comprise at least a two-step RACH procedure and a four-step RACH procedure.

20. The UE of claim 13, wherein:
the selecting the RACH procedure includes selecting a two-step RACH procedure; and
the transmitting one or more messages comprises transmitting a first message including a physical RACH (PRACH) sequence used as a reference signal by a base station or a sounding reference signal by the base station.

21. The UE of claim 20, wherein the transmitting one or more messages comprises transmitting a payload as part of a first message and occurs during a handover of the UE.

22. The UE of claim 21, wherein the payload is a measurement report, a buffer status report, channel state feedback (CSF) information, or user data.

23. The UE of claim 13, further comprising the one or more processors executing the instructions to:

receive, from a base station during a handover of the UE, timing adjustment information.

24. The UE of claim 13, wherein the selecting the RACH procedure includes selecting a two-step RACH procedure and the transmitting one or more messages comprises transmitting a first message to a base station over one or more beams, and further comprising the one or more processors executing the instructions to:
  receive, from the base station, a second message over the one or more beams in response to transmitting the first message.

25. A non-transitory computer readable medium storing computer executable code for a random access channel (RACH) procedure at a user equipment (UE) using, comprising:
  code for receiving, at the UE, RACH configuration information from a base station, with the RACH configuration information being in a master information block (MIB) or a system information block (SIB);
  code for selecting, at the UE, a RACH procedure from among at least two RACH procedures, with the selecting based at least on the RACH configuration information; and
  code for transmitting, from the UE, one or more messages associated with the selected RACH procedure.

26. The non-transitory computer readable medium of claim 25, further comprising:
  code for receiving, at the UE, either a synchronization signal or a reference signal from a base station; and wherein the selecting the RACH procedure is based on the RACH configuration information and either the received synchronization signal or the received reference signal.

27. The non-transitory computer readable medium of claim 26, wherein the code for selecting the RACH procedure is based on the RACH configuration information and either a reference signal received power (RSRP) value of the received synchronization signal or a RSRP value of the received reference signal in comparison with a corresponding threshold value.

28. The non-transitory computer readable medium of claim 27, wherein the corresponding threshold value is from the RACH configuration information.

29. The non-transitory computer readable medium of claim 27, wherein the code for selecting the RACH procedure includes selecting a two-step RACH procedure and further comprises:
  code for switching from the selected two-step RACH procedure to a four-step RACH procedure if a transmit power required to transmit a message is higher than a threshold or if the RSRP value of the received synchronization signal or of the received reference signal falls below a threshold during re-transmission of the message or if a command to switch is received from the base station.

30. The non-transitory computer readable medium of claim 29, further comprising:
  code for using a transmit power based on the selected two-step RACH procedure prior to the switching, code for applying an offset to the transmit power based on the selected two-step RACH procedure prior to the switching, or code for using a transmit power based on a four-step RACH procedure, and prior to receiving a response from the base station.

31. The non-transitory computer readable medium of claim 25, wherein the at least two RACH procedures comprise at least a two-step RACH procedure and a four-step RACH procedure.

32. The non-transitory computer readable medium of claim 25, wherein
  the code for selecting the RACH procedure includes code for selecting a two-step RACH procedure; and
  the code for transmitting one or more messages comprises code for transmitting a first message including a physical RACH (PRACH) sequence used as a reference signal by a base station or a sounding reference signal by the base station.

33. The non-transitory computer readable medium of claim 32, wherein the code for transmitting one or more messages comprises code for transmitting a payload as part of a first message and occurs during a handover of the UE.

34. The non-transitory computer readable medium of claim 33, wherein the payload is a measurement report, a buffer status report, channel state feedback (CSF) information, or user data.

35. The non-transitory computer readable medium of claim 25, further comprising:
  code for receiving, from a base station during a handover of the UE, timing adjustment information.

36. The non-transitory computer readable medium of claim 25, wherein the code for selecting the RACH procedure includes code for selecting a two-step RACH procedure and the transmitting one or more messages comprises transmitting a first message to a base station over one or more beams, and further comprising:
  code for receiving, from the base station, a second message over the one or more beams in response to transmitting the first message.

* * * * *